(12) United States Patent
Schmidt

(10) Patent No.: US 11,069,944 B2
(45) Date of Patent: Jul. 20, 2021

(54) ROLLED-UP ENERGY STORAGE ELEMENTS AND METHOD FOR THE PRODUCTION THEREOF

(71) Applicant: LEIBNIZ-INSTITUT FUER FESTKOERPER-UND WERKSTOFFFORSCHUNG DRESDEN E.V, Dresden (DE)

(72) Inventor: Oliver G. Schmidt, Dresden (DE)

(73) Assignee: LEIBNIZ-INSTITUT FUER FESTKOERPER-UND WERKSTOFFFORSCHUNG DRESDEN E.V., Dresden (DE)

( * ) Notice: Subject to any disclaimer, the term of this patent is extended or adjusted under 35 U.S.C. 154(b) by 0 days.

(21) Appl. No.: 15/986,399

(22) Filed: May 22, 2018

(65) Prior Publication Data

US 2018/0342725 A1 Nov. 29, 2018

(30) Foreign Application Priority Data

May 24, 2017 (DE) ...................... 10 2017 111 463.7

(51) Int. Cl.
*H01G 11/30* (2013.01)
*H01G 4/30* (2006.01)
(Continued)

(52) U.S. Cl.
CPC .......... *H01M 50/538* (2021.01); *H01G 4/308* (2013.01); *H01G 4/32* (2013.01);
(Continued)

(58) Field of Classification Search
CPC .................. H01M 2/263; H01M 4/62; H01M 2300/0068; H01M 2300/0002;
(Continued)

(56) References Cited

U.S. PATENT DOCUMENTS 5,445,906 A 8/1995 Hobson et al.
8,136,213 B2 * 3/2012 Schmidt .................. H01G 4/30
29/25.42
(Continued)

FOREIGN PATENT DOCUMENTS

DE 11 2015 003 602 5/2017
EP 2 023 357 2/2009
(Continued)

*Primary Examiner* — Nathan Milakovich
(74) *Attorney, Agent, or Firm* — Greenblum & Bernstein, P.L.C.

(57) ABSTRACT

Rolled-up energy storage elements, each including a rolled layer stack of layers which are arranged within a layer plane in an at least partially covering manner. In the layer stack, at least two layers are present which are at least partially electrically conductive, and at least one layer of a non-liquid electrolyte material is present, or at least one region between at least two layers of the rolled layer stack is present which comprises a liquid electrolyte. Either at least one of the layers that is at least partially electrically conductive includes at least partially a magnetic material, or an additional layer that includes at least partially a magnetic material in the layer stack.

14 Claims, 2 Drawing Sheets

(51) Int. Cl.
   *H01G 4/32*      (2006.01)
   *H01M 10/04*     (2006.01)
   *H01M 4/62*      (2006.01)
   *H01M 50/538*    (2021.01)

(52) U.S. Cl.
   CPC ............. *H01G 11/30* (2013.01); *H01M 4/62* (2013.01); *H01M 10/0431* (2013.01); *H01M 2300/0002* (2013.01); *H01M 2300/0065* (2013.01); *H01M 2300/0068* (2013.01)

(58) Field of Classification Search
   CPC ........... H01M 2300/0065; H01G 11/30; H01G 4/308; H01G 4/32
   See application file for complete search history.

(56) References Cited

U.S. PATENT DOCUMENTS

| | | | | |
|---|---|---|---|---|
| 9,166,247 | B2* | 10/2015 | Hagiwara | H01M 4/04 |
| 9,431,082 | B2* | 8/2016 | Makarov | H01L 43/08 |
| 2011/0165462 | A1* | 7/2011 | Zhamu | H01M 4/134 |
| | | | | 429/223 |
| 2013/0252088 | A1* | 9/2013 | Kuriki | H01M 10/0562 |
| | | | | 429/211 |
| 2013/0260207 | A1* | 10/2013 | Uemura | H01M 2/16 |
| | | | | 429/144 |
| 2014/0045021 | A1* | 2/2014 | Okutani | H01M 10/0563 |
| | | | | 429/94 |
| 2017/0162332 | A1* | 6/2017 | Suzuki | H01G 4/1227 |
| 2017/0229743 | A1 | 8/2017 | Fro | |
| 2018/0350523 | A1* | 12/2018 | Suzuki | H01G 4/224 |
| 2019/0062154 | A1* | 2/2019 | Karnaushenko | B81B 5/00 |

FOREIGN PATENT DOCUMENTS

| | | |
|---|---|---|
| WO | 2016/031076 | 3/2016 |
| WO | WO-2016031076 A1 * | 3/2016 ............... H01G 4/32 |

* cited by examiner

ROLLED-UP ENERGY STORAGE ELEMENTS AND METHOD FOR THE PRODUCTION THEREOF

CROSS-REFERENCE TO RELATED APPLICATION

This application claims priority under 35 U.S.C. § 119(a) of German Patent Application No. DE 10 2017 111 463.7 filed May 24, 2017, the disclosure of which is expressly incorporated by reference herein in its entirety.

The present invention concerns the field of energy engineering and relates to rolled-up energy storage elements, such as can be used in particular as batteries or supercapacitors, and to a method for the production thereof.

The provision of energy for standalone electrical and electronic systems presents one of the greatest challenges of the current age. The requirements of the electrical and electronic systems that are to be supplied with energy thereby constitute the specific challenges, for example in regard to the dimensions or the type and quantity of the energy which is to be provided. One widely pursued approach for producing energy storage elements of this type is to manufacture and modify electrochemical batteries.

One possibility for embodying energy storage elements of this type is, among other things, rolled-up layer systems. The energy-storing layer systems are thereby transferred onto a thin, flexible web material and then, by means of external mechanical forces, rolled up together with the web material into the shape of a compact cylindrical geometry with many windings [U.S. Pat. No. 5,445,906 A].

These rolled-up layer systems have an inner diameter in the millimeter range and contain a rolled-up layer of web material, the layer thickness of which is in the micrometer range. For these reasons, an adequately large portion of the volume cannot be efficiently utilized for energy storage, as a consequence of which these rolled-up layer systems cannot achieve energy densities high enough for many applications.

Self-rolling layers which do not contain any web material are known and can be used to produce ultracompact cylindrical capacitors in the micrometer range [EP 2 023 357 B1].

A disadvantage of the known solutions from the prior art, however, is that a straight and independent rolling-up of the layer stack over long distances cannot be ensured in an adequately reproducible and reliable manner, and that as a result the usable rolling length and the number of windings of self-rolled energy storage elements is limited.

SUMMARY

The object of the present invention is the specification of rolled-up energy storage elements that have high energy densities and which comprise a large number of self-rolled windings and essentially completely parallel outer edges of the respective layers of the rolled layer stack; and furthermore the specification of a cost-effective, environmentally friendly, and time-saving method for the production of the rolled energy storage elements having many windings.

The object is attained by the invention disclosed in the claims. Advantageous embodiments are the subject matter of the dependent claims.

The rolled energy storage elements are each composed of a rolled layer stack of layers which are arranged within a layer plane in an at least partially covering manner, and in the layer stack
  at least two layers are present which are at least partially electrically conductive, and
  at least one layer of a non-liquid electrolyte material is present, or at least one region between at least two layers of the rolled layer stack is present which comprises a liquid electrolyte, wherein either at least one of the layers that are at least partially electrically conductive is composed at least partially of a magnetic material, or an additional layer that is composed at least partially of a magnetic material is present in the layer stack.

Advantageously, the number of rolled windings is at least 10.

Also advantageously, the layer thickness of the entire layer stack is maximally 1 mm.

Likewise advantageously, no web material is rolled-in.

And also advantageously, the layer stack furthermore comprises at least two at least partially electrically conductive layers that are arranged within a layer plane in an at least partially covering manner, between which layers, also within a layer plane, at least one electrically insulating layer is arranged.

It is advantageous if the topmost layer of the layer stack is composed of an at least partially electrically insulating material.

It is likewise advantageous if all outer surfaces, except for a part of the electrically conductive layers, are covered by an electrically insulating layer.

It is furthermore advantageous if the topmost layer is composed of an electrically conductive material and the layer positioned thereunder is composed of an electrically insulating material.

And it is also advantageous if the layer stack is composed of two electrically conductive layers, between which one layer of a cathode material and one layer of an anode material are arranged, between which in turn one layer of an electrolyte material is arranged, and an electrically insulating layer is arranged on the upper electrically conductive layer, wherein at least one of the electrically conductive layers is composed of a magnetic material.

It is also advantageous if the layers or the part of a layer of the magnetic material are composed of Co, Fe, Nd, Ni; or of Co-, Fe-, Nd- or Ni-based alloys; or of alloys of these materials.

It is furthermore advantageous if the layer of the electrolyte material is a solid-state electrolyte material and, more advantageously, is composed of LiPON.

It is likewise advantageous if the layer of the cathode material is composed of at least one metal oxide.

And it is also advantageous if at least two layers of electrically conductive material are provided with electrically conductive contact electrodes on the two spiral-shaped faces of the rolled-up layer stack.

In the method according to the invention for the production of rolled-up energy storage elements, at least one layer stack is applied to a substrate or a sacrificial layer on a substrate in a differentially strained manner, wherein the layer stack
  is composed of at least two layers that are arranged within a layer plane in an at least partially covering manner, and in the layer stack the materials of at least two layers are at least partially electrically conductive, and
  either an additional layer is present which is composed of a non-liquid electrolyte material, or at least before and/or during and/or after the rolling-up of the layer stack a region is produced that can be filled with a liquid electrolyte, and
  the material of at least one of the layers that are at least partially electrically conductive is at least partially a magnetic material, or an additional layer of a magnetic material is present, and subsequently the independent rolling-up of the layer stack is induced, and at least intermittently during the rolling-up of the layer stack the layer stack is exposed to an external magnetic field, the field strength of which is at least greater than the field strength of the Earth's magnetic field, and the liquid electrolyte is added into the region before or during or after the rolling-up of the layer stack.

Advantageously, an external magnetic field is applied in which the magnetic field lines projected onto the not yet rolled-up layer stack are aligned approximately perpendicularly or exactly perpendicularly to the rolling direction of the layer stack.

Likewise advantageously, at least two or a plurality of the layer stacks with a magnetic material are self-rolled in exactly one rolling direction.

Further advantageously, at least one of the layers of an electrically conductive material is arranged essentially transversely to the rolling-up direction such that it extends beyond the width of the layer stack on one side, and at least a second of the layers of an electrically conductive material is arranged essentially transversely to the rolling-up direction such that it extends beyond the width of the layer stack on the other side.

And also advantageously, at least two or a plurality of the layer stacks with a magnetic material are arranged in a differentially strained manner, wherein at least one layer stack is self-rolled in one direction and at least one layer stack is self-rolled in another direction, and first the layer stack or stacks with the first rolling direction is/are exposed at least intermittently during the independent rolling-up to an external magnetic field, the field strength of which is at least greater than the field strength of the Earth's magnetic field and of which the magnetic field lines projected onto the not yet rolled-up layer stack are aligned approximately perpendicularly or exactly perpendicularly to this first rolling direction of the layer stack, and subsequently the layer stack or stacks with a different rolling direction is/are exposed at least intermittently during the independent rolling-up to an external magnetic field, the field strength of which is at least greater than the field strength of the Earth's magnetic field and of which the magnetic field lines projected onto the not yet rolled-up layer stack are aligned approximately perpendicularly or exactly perpendicularly to this other rolling direction of the layer stack, and this method sequence is then carried out consecutively for each layer stack rolling direction.

It is also advantageous if an external magnetic field with flux densities between 1 mT and 1 T and/or with a varying flux density is used.

It is likewise advantageous if the layer stack or stacks is/are exposed to the external magnetic field throughout the entire duration of the rolling-up.

It is furthermore advantageous if the rolled-up energy storage elements are removed from the substrate surface by application of at least one magnetic field.

And it is also advantageous if rolled-up energy storage elements are integrated into electric circuits with the aid of a pick-and-place process, wherein the rolled-up energy storage elements are exposed to an external magnetic field at least intermittently during the pick-and-place process.

It is also advantageous if two or more layers are arranged within a layer plane such that they only partially cover the layers arranged thereunder and/or thereabove.

According to the invention, the rolled-up energy storage elements specified by the invention, which elements have been produced according to the invention, are used in electric or electronic circuits.

With the present invention, it becomes possible for the first time to specify rolled-up energy storage elements that have high energy densities and comprise a large number of self-rolled windings and essentially parallel outer edges of the respective layers of the rolled-up layer stack, and furthermore the specification of a cost-effective, environmentally friendly, and time-saving method for the production of the rolled-up energy storage elements having a high energy density and many windings.

DETAILED DESCRIPTION

Figure 1:
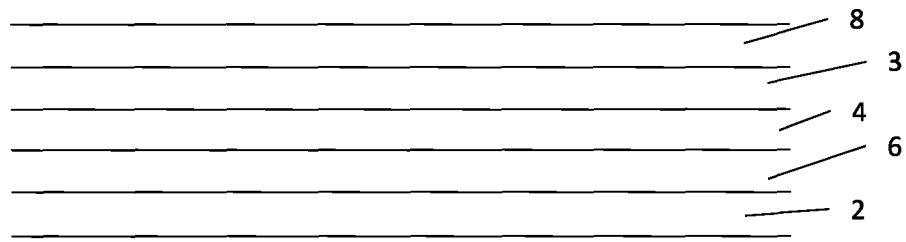
FIG. 1 illustrates an embodiment of the stack of layers including a non-liquid electrolyte and an at least partially magnetic additional layer.
Figure 2:
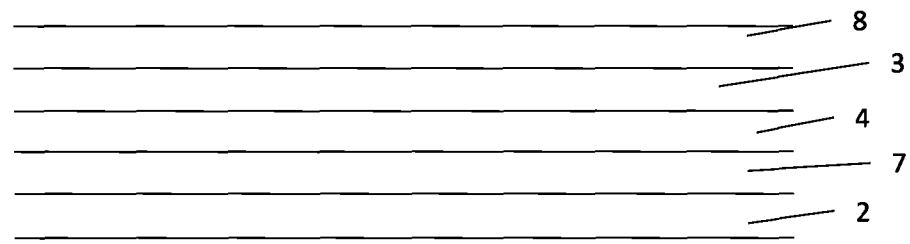
FIG. 2 illustrates an embodiment of the stack of layers including a liquid electrolyte and an at least partially magnetic additional layer.
Figure 3:
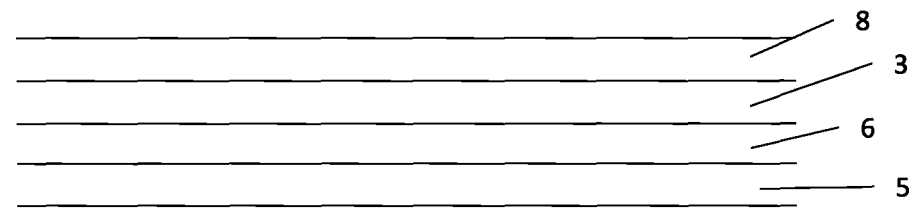
FIG. 3 illustrates an embodiment of the stack of layers including a non-liquid electrolyte and one of the at least conductive layers includes at least partially magnetic material.
Figure 4:
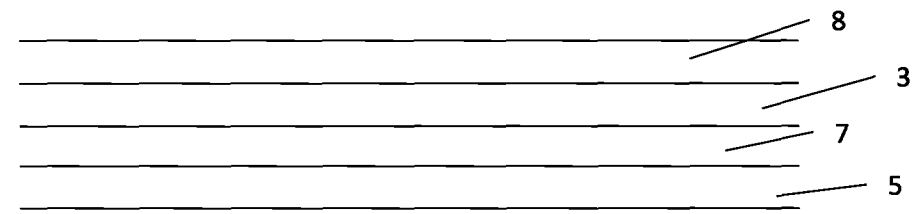
FIG. 4 illustrates an embodiment of the stack of layers including a liquid electrolyte and one of the at least conductive layers includes at least partially magnetic material.

As shown in FIGS. 1-4, the embodiments are achieved by rolled-up energy storage elements that are composed of a rolled-up layer system, wherein the materials of at least two layers 2, 3 are at least partially electrically conductive, and the material of at least one layer is a non-liquid electrolyte material 6, as in FIGS. 1 and 3, or at least one region that is filled with a liquid electrolyte 7, as in FIGS. 2 and 4, is present between the at least two layers 2, 3 of the rolled-up layer stack. As a result of this layer structure, energy can be stored electrochemically. Furthermore, according to the invention either the material of at least one layer 5, as in FIGS. 3 and 4, of the electrically conductive material is at least partially a magnetic material, or an additional layer 4, as in FIGS. 1 and 2, that is at least partially composed of a magnetic material is present.

Figure 5:
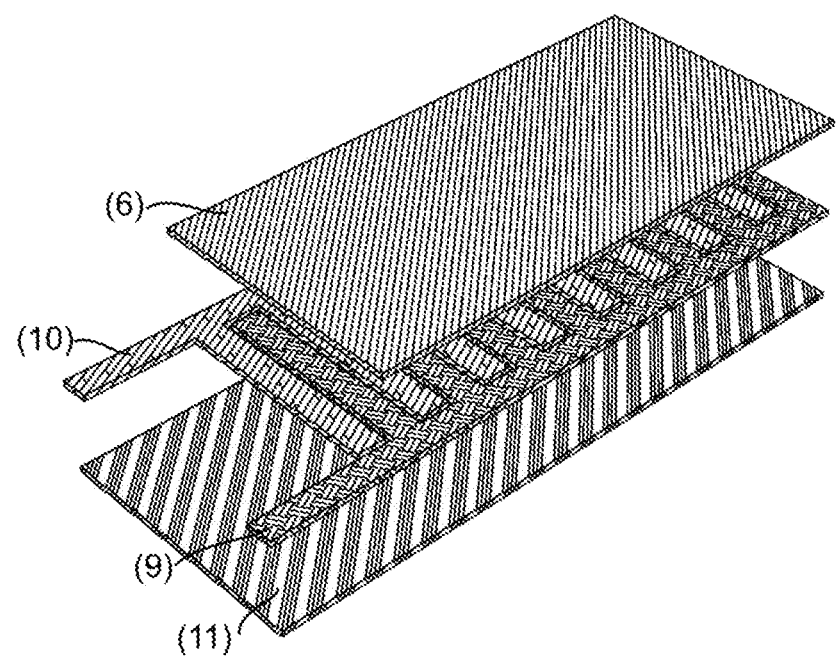
FIG. 5 illustrates an embodiment of the stack of layers including layers with meandering or finger-like shapes.

A layer structure can thereby be produced in which two or more layers 9, 10 within a layer plane do not fully cover the layers arranged thereunder and/or thereabove. This can be, for example, due to a formation of layers which are arranged relative to one another in a meandering or finger-like shape, as in FIG. 5. Layers 9, 10 can be arranged on a support layer 11 and covered by non-liquid electrolyte 6.

Advantageously, the layer of electrolyte material 6 is arranged between the two layers of electrically conductive materials 3, 5, and one of the layers of the electrically conductive material 3, 5 is at the same time a magnetic material. In a layer structure of this type, a layer of an electrically insulating material 8 is applied as a topmost layer.

The non-liquid electrolyte material 6 can be of a gel type, polymer type, or solid type and is advantageously a solid-state electrolyte material, such as LiPON, for example.

However, it is also possible to use liquid electrolytes 7. For this purpose, a region between the two layers 2, 3 or 2, 5 is produced before and/or during and/or after the rolling-up of the layer stack, which region can be filled with an electrolyte 7 and into which a liquid electrolyte 7 is added before or during or after the rolling-up of the layer stack.

The magnetic material required according to the invention is a layer or part of a layer and is advantageously composed of Co, Fe, Nd, Ni; or of Co-, Fe-, Nd-, or Ni-based alloys; or of alloys of these materials.

The at least two or more layers of an electrically conductive material can be composed of metals or metal alloys, or of 2D materials, or of combinations of these materials.

According to the invention, at least the two layers of an electrically conductive material can be used as electrodes. In this case, it is advantageous if at least one layer of an electrically conductive material is arranged essentially transversely to the rolling-up direction such that it extends beyond the width of the layer stack on one side, and an at least second layer of an electrically conductive material is arranged essentially transversely to the rolling-up direction such that it extends beyond the width of the layer stack on the other side, and they are in contact with two electrically non-connected electrodes on the two spiral-shaped faces.

Also according to the invention, the at least two layers of an electrically conductive material can furthermore also serve as anode and cathode and can act as an electrochemical cell with the layer of an electrolyte material, advantageously a solid electrolyte material, arranged between said layers.

Also according to the invention, at least one of the two layers of an electrically conductive material is thereby also at least partially composed of a magnetic material.

In the event that the outer surfaces of the self-rolled layers are composed of an electrically conductive material, it is advantageous if these outer surfaces, except for at least one part of the electrically conductive layers that serve as contact electrodes, are covered by an electrically insulating layer.

Furthermore, the rolled-up energy storage elements according to the invention are advantageously packaged individually.

The rolled-up energy storage elements according to the invention can be used in a particularly advantageous manner as microbatteries or supercapacitors that can also have overall dimensions in the micrometer, millimeter, and centimeter ranges.

The solutions from the prior art often have dimensions for the inner diameters of the rolled-up layer stack equal to a diameter of more than 1 mm. In the solution according to the invention, rolled-up energy storage elements with an inner diameter of even 0.1 to 100 μm, for example, can be produced in a cost-effective, environmentally friendly, and energy-saving manner. Despite the small dimensions, the energy storage elements according to the invention can nevertheless comprise a high number of windings, for example, from 10 up to 400 windings or more.

As a result of the low layer thicknesses possible for the layer stack and the subsequent independent rolling-up of the layer stack, rolled-up energy storage elements specified by the invention are produced according to the invention, which elements achieve a high energy density within a small space.

Another advantage of the solution according to the invention for rolled-up energy storage elements is that they can be produced on substrates which, in contrast to the solutions from the prior art, can also easily survive at relatively high temperatures (>200° C.). The energy storage element according to the invention can then be transferred to other substrates.

The rolled-up energy storage elements are produced according to the invention in that at least one layer stack is applied to a substrate or a sacrificial layer in a differentially strained manner. The sacrificial layer is thereby also located on a substrate.

The layers of the layer stack are thereby applied in a differentially strained manner on top of one another, wherein a strain gradient is created across the height of the layer stack.

To initiate the independent rolling-up, the strain is then released. For example, in the event that a sacrificial layer is present, this can take place by means of a partial or complete removal of the sacrificial layer.

Within the scope of the present invention, sacrificial layer should be understood as meaning a layer which is partially or completely removed from the substrate and/or the rolled-up layer stack, and/or which is modified in such a way that this modification causes the rolling-up of the layer stack. The modification can be effected, for example, by changing a temperature or pressure, or by inducing a chemical reaction.

According to the invention, a layer stack is produced that is composed of at least three layers, of which layers the materials of at least two layers are at least partially electrically conductive. In this case, the material of the at least one additional layer is a non-liquid electrolyte material.

However, the rolled-up layer stack according to the invention can also be composed of at least two layers, the materials of which are at least partially electrically conductive, and at least one region is present between at least two layers of the rolled-up layer stack, which region can be filled with a liquid electrolyte before or during or after the rolling-up.

The region itself can be produced before and/or during and/or after the rolling-up of the layer stack.

Additionally, according to the invention the material of at least one of the layers that are at least partially electrically conductive is at least partially a magnetic material, or an additional layer of a magnetic material is applied.

It is essential to the invention that, after the production of the layer stack, the independent rolling-up of the layer stack is induced, and the layer stack is exposed to an external magnetic field at least intermittently during the self-rolling of the layer stack. This external magnetic field has a field strength that is at least greater than the field strength of the Earth's magnetic field, advantageously between 1 mT and 1 T, and can also be used with a varying, for example pulsed, field strength or field direction.

Furthermore, it is of particular significance that these magnetic field lines of the external magnetic field, which field lines are projected onto the not yet rolled-up layer stack, are aligned approximately perpendicularly, or advantageously exactly perpendicularly, to the rolling direction of the layer stack.

The layer stack or stacks should advantageously be exposed to the external magnetic field during the entire rolling-up.

With the method according to the invention, at least two or a plurality of the layer stacks with a magnetic material can advantageously be self-rolled. The simultaneous production of a plurality of rolled-up energy storage elements is thus possible, which elements can be packaged and transported to their location of use after being produced.

The external magnetic field can be created by an electromagnet or permanent magnet, or by a combination of both.

With the method according to the invention, a nearly exactly straight, or exactly straight, rolling-up of the layer stack can be achieved and, at the same time, the self-rolled magnetic energy storage elements can be produced and used with layer thicknesses that are a great deal smaller than was previously the case. As a result of the method according to the invention, a mass production of self-rolled energy storage elements of this type can also be carried out.

The invention is explained below in greater detail with the aid of an exemplary embodiment.

EXAMPLE

First, a water-soluble sacrificial layer of germanium oxide is applied to the surface of a silicon substrate. Then, a 1-µm thick ferromagnetic layer of nickel is applied as a first electrically conductive layer to the surface of the sacrificial layer, followed by a layer of $LiCoO_2$ as a cathode with a thickness of 1 µm. A solid-state electrolyte layer of LiPON is subsequently applied with a thickness of 10 µm to the surface of the cathode layer. This is followed by a layer of Si as an anode with a thickness of 1 µm. The layer stack is completed with the upper, second electrically conductive layer of nickel with a thickness of 1 µm, followed by a 500-nm thick Cr layer that creates a significant expansion strain, and a 100-nm thick electrically insulating layer of $Al_2O_3$. The two electrically conductive layers serve as electric current collectors for the rolled-up layer stack.

The layer stack is structured in-plane using photolithographic methods, whereby the layer stack has a width of 1 cm and a length of 20 cm, and the two electrically conductive current-collector layers protrude past the long sides of the layer stack by 200 µm. On one of the short sides, a strip of the layer stack is removed by means of reactive ion etching, whereby the sacrificial layer becomes visible again and can be dissolved from this position. The substrate is then placed in water with the layer stack. The sacrificial layer dissolves and, due to the differentially integrated strain and also by applying an external magnetic field with a flux density of 500 mT, the field lines of which point perpendicularly to the rolling direction and layer thickness, the layer stack rolls up on its own in a straightly aligned and compact manner to form a tightly wound microbattery having 400 windings.

The microbattery, which is located on the substrate, is then lifted off the substrate, connected to electrode material on the two spiral-shaped faces, and electrically insulated on the entire surface that now remains. The microbattery is then transported to its location of use in a packaged state and used as a discrete power-supplying energy storage element in an electric or electronic circuit.

The invention claimed is:

1. Rolled-up energy storage elements, each including a rolled stack of layers, in which the stack of layers are arranged within a layer plane in an at least partially covering manner, and
    the stack of layers comprising:
    at least two layers that are at least partially electrically conductive,
    at least one electrolyte region formed between the at least two layers that are at least partially electrically conductive, the at least one electrolyte region containing a non-liquid electrolyte material or being filled with a liquid electrolyte,
    wherein an entire thickness of the stack of layers is maximally 1 mm and the rolled stack of layers includes at least 10 completely rolled windings,
    one layer of a cathode material and one layer of an anode material, which are arranged between the at least two layers that are at least partially electrically conductive and, in which the at least one electrolyte region is arranged between the cathode material and the anode material, and
    an electrically insulating layer being arranged on an uppermost one of the at least two layers that are at least partially electrically conductive,
    wherein at least one of the at least two layers that are at least partially electrically conductive comprises an at least partially magnetic material.

2. The rolled-up energy storage elements according to claim 1,
    wherein the number of the rolled windings in the rolled stack of layers is between 20 to 400 completely rolled windings.

3. The rolled-up energy storage elements according to claim 1,
    wherein no web material is rolled-in.

4. The rolled-up energy storage elements according to claim 1, further comprising at least one electrically insulating layer arranged within the layer plane and between the at least two layers that are at least partially electrically conductive.

5. The rolled-up energy storage elements according to claim 1,
    wherein a topmost layer of the stack of layers is composed of an at least partially electrically insulating material.

6. The rolled-up energy storage elements according to claim 1,
    wherein all outer surfaces of the rolled-up stack of layers, except for a part of the at least two layers that are at least partially electrically conductive, are covered by an electrically insulating layer.

7. The rolled-up energy storage elements according to claim 1,
    wherein a topmost layer of the stack of layers comprises an electrically conductive material and a layer comprising an electrically insulating material is positioned directly under the topmost layer.

8. The rolled-up energy storage elements according to claim 1,
    wherein the at least partially magnetic material is composed of Co, Fe, Nd, or Ni; or of Co-, Fe-, Nd- or Ni-based alloys; or of alloys of these materials.

9. The rolled-up energy storage elements according to claim 1,
    wherein the non-liquid electrolyte material is a solid-state electrolyte material composed of LiPON.

10. The rolled-up energy storage elements according to claim 1 wherein the cathode material comprises at least one metal oxide.

11. The rolled-up energy storage elements according to claim 1, wherein the rolled stack of layers comprises two spiral-shaped faces, and
    wherein the at least two layers that are at least partially electrically conductive are provided with electrically conductive contact electrodes on the two spiral-shaped faces of the rolled stack of layers.

12. A method of using the rolled-up energy storage elements according to claim 1, comprising:
    connecting the rolled-up energy storage elements in electric or electronic circuits as discrete power-supplying energy storage elements.

13. Rolled-up energy storage elements, each including a rolled stack of layers, in which the stack of layers are arranged within a layer plane in an at least partially covering manner, and the stack of layers comprising:
at least two layers that are at least partially electrically conductive, and
at least one electrolyte region formed between the at least two layers that are at least partially electrically conductive, the at least one electrolyte region containing a non-liquid electrolyte material or being filled with a liquid electrolyte,
wherein an at least partially magnetic material is contained in one of:
at least one of the at least two layers that are at least partially electrically conductive or
an additional layer,
wherein an entire thickness of the stack of layers is maximally 1 mm and the rolled stack of layers includes at least 10 completely rolled windings, and
wherein the at least two layers that are at least partially electrically conductive are formed as finger-like shapes.

14. The rolled-up energy storage elements according to claim 1, wherein the rolled stack of layers is magnetized.

* * * * *